(12) United States Patent
Levy et al.

(10) Patent No.: US 10,277,636 B2
(45) Date of Patent: Apr. 30, 2019

(54) FPGA OFFLOAD MODULE AND PROCESSES FOR SEAMLESS FRAME-LEVEL SWITCHING OF MEDIA STREAMS IN REAL-TIME

(71) Applicants: Marc Levy, San Diego, CA (US);
Randy Godwin, Memphis, TN (US)

(72) Inventors: Marc Levy, San Diego, CA (US);
Randy Godwin, Memphis, TN (US)

(73) Assignee: MACNICA AMERICAS, INC., Solana Beach, CA (US)

( * ) Notice: Subject to any disclaimer, the term of this patent is extended or adjusted under 35 U.S.C. 154(b) by 0 days.

(21) Appl. No.: 15/699,046

(22) Filed: Sep. 8, 2017

(65) Prior Publication Data
US 2018/0069903 A1 Mar. 8, 2018

Related U.S. Application Data

(60) Provisional application No. 62/385,182, filed on Sep. 8, 2016.

(51) Int. Cl.
*H04L 29/06* (2006.01)
(52) U.S. Cl.
CPC ...... *H04L 65/1026* (2013.01); *H04L 65/1066* (2013.01); *H04L 65/605* (2013.01); *H04L 65/607* (2013.01); *H04L 65/80* (2013.01); *H04L 65/601* (2013.01)

(58) Field of Classification Search
CPC ... H04L 65/1026; H04L 65/80; H04L 65/607; H04L 65/1066
See application file for complete search history.

(56) References Cited

U.S. PATENT DOCUMENTS

| 2004/0218093 | A1 | 4/2004 | Radha et al. |
| 2005/0172199 | A1* | 8/2005 | Miller ...................... H04L 1/08 714/749 |
| 2012/0016965 | A1 | 1/2012 | Chen et al. |
| 2013/0132603 | A1 | 5/2013 | Cohen et al. |
| 2014/0201761 | A1 | 7/2014 | Dalal et al. |

FOREIGN PATENT DOCUMENTS

| WO | WO 20040218093 A1 | 12/2009 |
| WO | WO 2015008023 A1 | 1/2015 |

* cited by examiner

*Primary Examiner* — Mohammad S Anwar
(74) *Attorney, Agent, or Firm* — Plager Schack LLP; Mark H. Plager; Stephen Hallberg (57) ABSTRACT

A combined hardware and software solution for real-time seamless switching of media streams using standard Ethernet switches and compliant end-points is disclosed. The combined hardware and software solution includes a FPGA offload module and a process for seamless frame-level switching of media streams in real-time. Specifically, the FPGA offload module and process for seamless frame-level switching of media streams in real-time includes hardware offload at an IP/Ethernet switch port, supporting switch software to enable seamless switching, and supporting end-point hardware and software to utilize seamless switching, thereby allowing video streams to be switched exactly between frames, and for switching losses to be recovered.

15 Claims, 8 Drawing Sheets

FPGA OFFLOAD MODULE AND PROCESSES FOR SEAMLESS FRAME-LEVEL SWITCHING OF MEDIA STREAMS IN REAL-TIME

CLAIM OF BENEFIT TO PRIOR APPLICATION

This application claims benefit to U.S. Provisional Patent Application 62/385,182, entitled "FPGA OFFLOAD MODULE AND PROCESS FOR SEAMLESS FRAME-LEVEL SWITCHING OF MEDIA STREAMS IN REAL-TIME," filed Sep. 8, 2016. The U.S. Provisional Patent Application 62/385,182 is incorporated herein by reference.

BACKGROUND

Embodiments of the invention described in this specification relate generally to media stream switching, and more particularly, to a field programmable gate array ("FPGA") offload module and process for frame-level switching of media streams in real-time.

Internet protocol ("IP")/Ethernet switches are designed to switch traffic based on sessions. IP/Ethernet switches are not designed to switch IP streams on designated packet boundaries, or to align streams in preparation for IP switching. Because switchover is not aligned, this results in switching losses that cannot be tolerated by endpoints streaming high bandwidth low latency media streams. Thus, end point cost per port is high, and switching of streams after media extraction is expensive.

Therefore, what is needed is a way to offload functions required for seamless switching at the IP/Ethernet switch so that video streams can be switched exactly between frames, and to ensure that switching losses can be recovered.

BRIEF DESCRIPTION

Some embodiments of the invention include a novel FPGA offload module and process for seamless frame-level switching of media streams in real-time. In some embodiments, the FPGA offload module and process for seamless frame-level switching of media streams in real-time uses standard IP/Ethernet switches and compliant end-points. In some embodiments, the FPGA offload module and process for seamless frame-level switching of media streams in real-time offloads functions required for seamless switching at an IP/Ethernet switch so that video streams can be switched exactly between frames.

In some embodiments, the FPGA offload module and process for seamless frame-level switching of media streams in real-time includes (i) hardware offload at an IP/Ethernet switch port, (ii) supporting switch software to enable seamless switching, and (iii) supporting endpoint hardware and software to utilize seamless switching, thereby allowing video streams to be switched exactly between frames, and for switching losses to be recovered.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having thus described the invention in general terms, reference is now made to the accompanying drawings, which are not necessarily drawn to scale, and which show different views of different example embodiments.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel FPGA offload module and process for seamless frame-level switching of media streams in real-time. In some embodiments, the FPGA offload module and process for seamless frame-level switching of media streams in real-time uses standard IP/Ethernet switches and compliant end-points. In some embodiments, the FPGA offload module and process for seamless frame-level switching of media streams in real-time offloads functions required for seamless switching at an IP/Ethernet switch so that video streams can be switched exactly between frames.

As stated above, IP/Ethernet switches are not designed to switch IP streams on designated packet boundaries, or to align streams in preparation for IP switching. End point cost per port is high, and switching of streams after media extraction is expensive. Specifically, the most common IP protocols switched by IP/Ethernet switches are: (i) TCP—which has a retry mechanism to overcome switching losses, but has high or variable latency; and (ii) UDP—which is intended for streams that can tolerate loss, but is low latency.

Media streams for live production video need to be lossless and low latency, so standard IP/Ethernet switches are not well suited to media stream switching, especially in the case of video streams which need to be switched exactly between frames, and for switching losses to be recovered.

Embodiments of the FPGA offload module and process for real-time seamless frame-level switching of media streams described in this specification solve these problems by offloading functions required for seamless switching at the IP/Ethernet switch. In some embodiments, the FPGA offload module and process for seamless frame-level switching of media streams in real-time includes (i) hardware offload at an IP/Ethernet switch port, (ii) supporting switch software to enable seamless switching, and (iii) supporting endpoint hardware and software to utilize seamless switching, thereby allowing video streams to be switched exactly between frames, and for switching losses to be recovered.

In some embodiments, a module is plugged into the optical cage of a standard IP/Ethernet switch. The module includes a device that allows the exact alignment of IP data streams. When switching is required, the old and the new data streams are directed to the external device which detects a video frame boundary. Initially the device outputs the old stream to the switch and then at the boundary point changes the output stream to the new data stream. In this way the video is seamlessly switched exactly at a video frame boundary.

Embodiments of the FPGA offload module and process for real-time seamless frame-level switching of media streams described in this specification differ from and improve upon currently existing options. In particular, some embodiments differ because existing IP/Ethernet switches are not able to perform seamless media stream switching, so switching needs to happen at the end point. That is, the endpoint needs to recover lost packets using either forward error correction, or from a redundant stream with a different switchover point. However, switching in the switch reduces the number of available Ethernet ports and cables required to enable switching at the endpoint. In contrast, some embodiments of the FPGA offload module and process for real-time seamless frame-level switching of media streams are able to perform seamless media stream switching in the IP/Ethernet switch. Switching in the IP/Ethernet switch reduces the number of Ethernet ports and cables needed to successfully switch at the endpoint.

In this specification, there are several descriptions of methods and processes that are implemented as software applications and run on computing devices to perform the steps of the methods and/or processes. However, it should be noted that for the purposes of the embodiments described in this specification, the word "method" is used interchangeably with the word "process". Methods or processes for real-time seamless frame-level switching of media streams are described, therefore, by reference to several example methods and processes that conceptually illustrate process steps for seamless IP switching of media streams.

Several more detailed embodiments are described in the sections below. Section I describes a seamless frame-level switching process for seamless frame-level switching of media streams in real-time. Section II describes a switch network system and a field programmable gate array (FPGA) offload module in a system device and in a switch device. Section III describes several processes for seamless IP switching of media streams, including an offload module stream switching process for switching from a primary media stream to a secondary media stream, a stream alignment process for aligning primary and secondary media streams, and an endpoint switch-over process. Section IV describes an electronic system that implements some embodiments of the invention.

I. Seamless Frame-Level Switching Process

The FPGA offload module and process for real-time seamless frame-level switching of media streams of the present disclosure may be comprised of the following elements. This list of possible constituent elements is intended to be exemplary only and it is not intended that this list be used to limit the FPGA offload module and process for real-time seamless frame-level switching of media streams of the present application to just these elements. Persons having ordinary skill in the art relevant to the present disclosure may understand there to be equivalent elements that may be substituted within the present disclosure without changing the essential function or operation of the FPGA offload module and process for real-time seamless frame-level switching of media streams.

1. FPGA offload device
2. Network software to control switching
3. A module that plugs into a network box optical cage The various elements of the FPGA offload module and process for real-time seamless frame-level switching of media streams of the present disclosure may be related in the following exemplary fashion. It is not intended to limit the scope or nature of the relationships between the various elements and the following examples are presented as illustrative examples only.

1. The FPGA has the custom electrical circuitry that aligns two video data streams and outputs one. The FPGA also detects the video frame boundary of the streams and makes the switch from one stream to another after the end of the video frame boundary is detected.

2. The Network software ("SW") controls the streams output to the FPGA and controls the operation of the FPGA and the IP/Ethernet switch in the overall system.

3. The module includes the FPGA and allows it to be plugged into a network system without modification of the network switch hardware.

Figure 1:
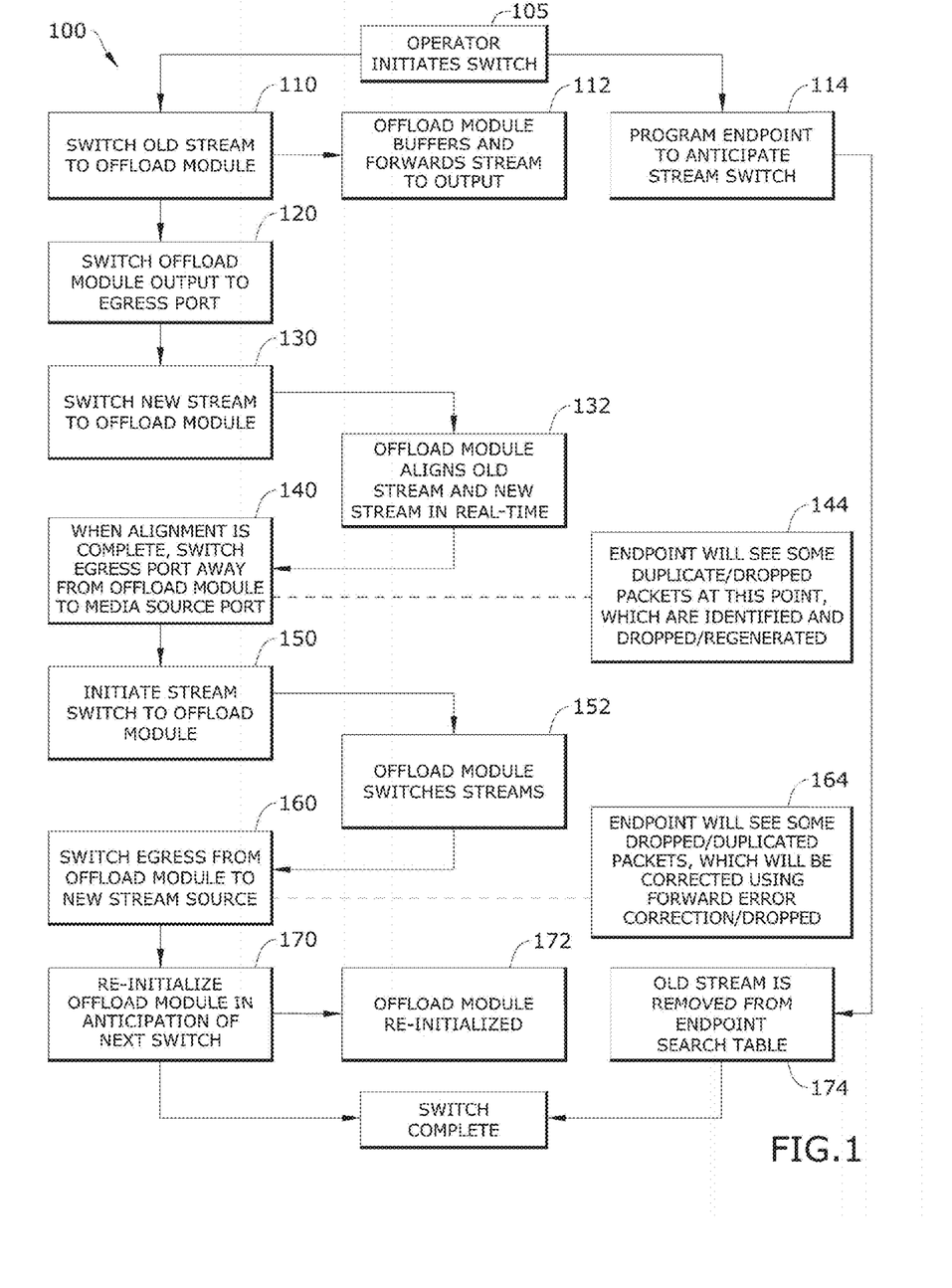
FIG. 1 conceptually illustrates a seamless frame-level switching process for seamless frame-level switching of media streams in real-time in some embodiments.

By way of example, FIG. 1 conceptually illustrates a seamless frame-level switching process 100 for seamless frame-level switching of media streams in real-time. In some embodiments, the seamless frame-level switching process 100 is performed on a switch network system that performs seamless IP switching of media streams. An example of a switch network system is described further below, by reference to FIG. 2. In some embodiments, the switch network system components used in switching the streams includes a network switch (steps 110, 120, 130, 140, 150, 160, and 170), an FPGA offload module (steps 112, 132, 152, and 172), and a program endpoint (steps 114, 144, 164, and 174). Examples of an offload module and an FPGA used in the offload module are described by reference to FIGS. 3-4, below. An example of the FPGA offload module in a network switch is described by reference to FIG. 5, below. In some embodiments, the program endpoint is a combination of hardware and software. Reference to endpoint hardware/software is described by reference to the switch network in FIG. 2, below. Additionally, the program endpoint performs forward error correction in instances when dropped and/or duplicate packets are detected between the different streams. An example of such detection and forward error correction is described below by reference to FIG. 6.

Now turning back to the seamless frame-level switching process 100 for seamless frame-level switching of media streams in real-time. In some embodiments, the seamless frame-level switching process 100 starts when an operator initiates (at 105) a switch of media streams, namely, an old stream and a new stream. After the operator initiates the switching of streams, the network switch switches (at 110) the old stream to the offload module. Then the offload module buffers and forwards (at 112) the old stream to output. Contemporaneously with these operations, and in connection with the operator initiating the switch from the old stream to the new stream, the program endpoint anticipates (at 114) the stream switch that has been initiated.

Next, the network switch switches (at 120) the offload module output to an egress port. After switching the offload module output to the egress port, the network switch then switches (at 130) the new stream to the offload module. In some embodiments, the offload module then aligns (at 132) the old stream and the new stream in real-time. When the alignment is complete, the network switch switches (at 140) the egress port away from the offload module to the media source port. At this point, the program endpoint will see some duplicate/dropped packets. Thus, the program endpoint identifies (at 144) either duplicate packets or dropped packets, and depending on whether the identified packets are either duplicates or dropped, will then conversely drop those packets which are duplicates, or regenerate the packets identified as dropped packets. An example of packet loss/duplication detection and forward error correction is described below by reference to FIG. 6.

In some embodiments, the network switch then initiates (at 150) a stream switch to the offload module, which then switches (at 152) the media streams. The network switch thereafter switches (at 160) the egress port from the offload module to the new stream source. Contemporaneously, the program endpoint will see some dropped/duplicated packets, which will be corrected similar to the manner described above. Specifically, the program endpoint will use forward error correction to regenerate/drop packets.

In some embodiments, the network switch re-initializes (at 170) the offload module in anticipation of the next stream switch. The offload module is then re-initialized (at 172, and the program endpoint removes (at 174) the old stream from the endpoint search table. Then the switching of the old stream and new stream is complete.

II. Switch Network System and FPGA Offload Module

In some embodiments, the seamless frame-level switching process 100 is completed via operations performed by various components of a switch network system and FPGA offload module. Specifically, the seamless frame-level switching process 100 of the present disclosure generally works by the combination of an IP/Ethernet switch (or switch network device), software, FPGA offload module, and endpoint hardware/software, all of which need to be used to perform a seamless switch between two media streams.

Figure 2:
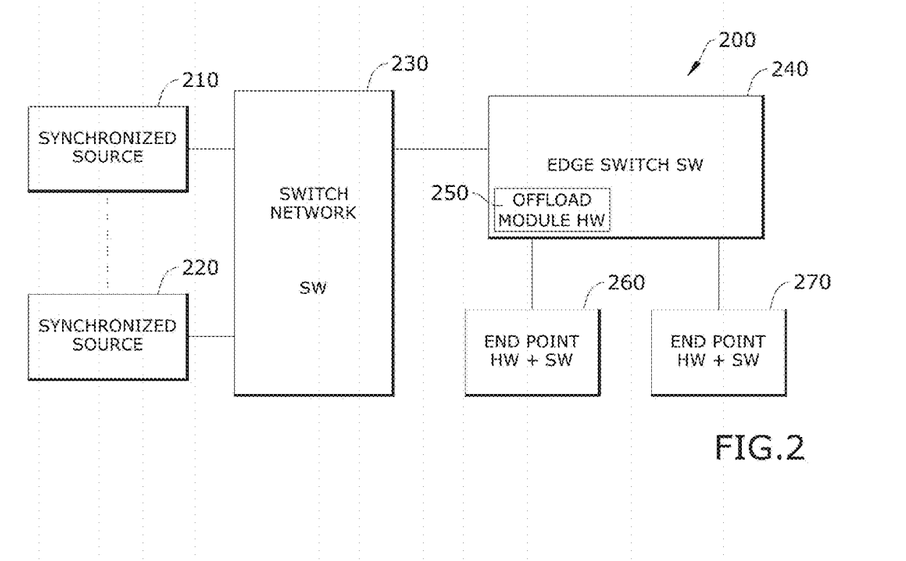
FIG. 2 conceptually illustrates a switch network system that performs seamless IP switching of media streams in some embodiments.

By way of example, FIG. 2 conceptually illustrates an example of such a switch network system 200 that performs seamless IP switching of media streams. As shown in this figure, the switch network system 200 includes multiple source streams, namely, a first synchronized source 210 and a second synchronized source 220. The switch network system 200 also includes a switch network 230 device with embedded switch software (SW), an edge switch 240 device with embedded switch software (SW), a hardware-based (HW) field programmable gate array (FPGA) offload module 250 embedded in the edge switch 240 device, a first end point 260 hardware (HW) device with embedded software (SW), and a second end point 270 hardware (HW) device with embedded software (SW).

In particular, the switch network system 200 performs seamless IP switching of media streams according to the following steps, where the first synchronized source 210 is the current stream 210 and the second synchronized source 220 is the new stream 220:

1. The switch network device 230 (or IP/Ethernet switch) forwards the current stream 210 to the FPGA offload module 250 on the edge switch 240.
2. The FPGA offload module 250 forwards the current stream to its output.
3. The switch network device 230 (or IP/Ethernet switch) then switches the output of the FPGA offload module 250 to the egress port.
4. The switch network device 230 (or IP/Ethernet switch) forwards the new stream 220 (that is, the stream to which it is switching) to the FPGA offload module 250 on the edge switch 240.
5. The FPGA offload module 250 on the edge switch 240 aligns the current stream 210 and the new stream 220.
6. The FPGA offload module 250 on the edge switch 240 performs the switch-over at the required switch boundary.
7. The switch network device 230 (or IP/Ethernet switch) then switches the egress port away from the FPGA offload module 250 to the media source port.
8. Switching losses, if any, are recovered. When the switch back from the FPGA offload module 250 to the ingress port occurs, either some duplicate packets will be sent, or some packets will be lost (or dropped). The endpoint (e.g., endpoint 260, endpoint 270) needs to drop duplicate packets or recover/regenerate lost packets (e.g., using Forward Error Correction ("FEC") or a redundant stream). Existing standards may be used for FEC or redundant stream switching. An example of applying FEC to recover lost packets is described by reference to FIG. 6, below.

As noted above, the FPGA offload module 250 performs the switch-over between the current stream and the new stream at the required switch boundary. Performing the switch-over is described next, by reference to FIG. 3, which conceptually illustrates a block diagram of a field programmable gate array (FPGA) offload module 300. As shown in this figure, the block diagram of the FPGA offload module 300 includes a receiver MAC/PHY $R_X$ 310, a pair of streams (align stream one 320 and align stream two 330), a switch multiplexer 340, and a transmitter MAC/PHY $T_X$ 350. The receiver MAC/PHY $R_X$ 310 and the transmitter MAC/PHY $T_X$ 350 may be included in a single transceiver device that connects incoming and outgoing Ethernet and/or optical wiring to the FPGA offload module 300.

Figure 3:
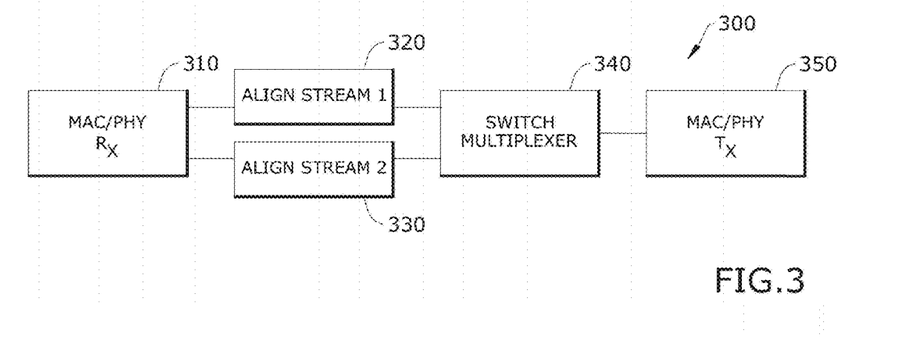
FIG. 3 conceptually illustrates a block diagram of a field programmable gate array (FPGA) offload module in some embodiments.

In relation to the seamless frame-level switching process 100, described above by reference to FIG. 1, the FPGA offload module 300 starts receiving the pair of streams at the receiver MAC/PHY $R_X$ 310 of the FPGA offload module 300. The FPGA offload module 300 buffers and forwards the pair of streams to output. The FPGA offload module 300 then aligns the streams in time, resulting in align stream one 320 and align stream two 330 being aligned in relation to the switch boundary. At the heart of the FPGA offload module 300 is the switch multiplexer 340, which takes the aligned streams and performs the stream switch-over at the required switch boundary, then providing the switched stream to the transmitter MAC/PHY $T_X$ 350.

The FPGA offload module 300 can take any of several form factors, including enhanced small form-factor pluggable (referred to as "SFP+" or "10 Gbits/s SFP+") or quad small form-factor pluggable ("QFSP") form factors. An example of the FPGA offload module 300 embedded in one of a SFP+ pluggable network switch module and a QFSP pluggable network switch module is described by reference to FIG. 4.

Figure 4:
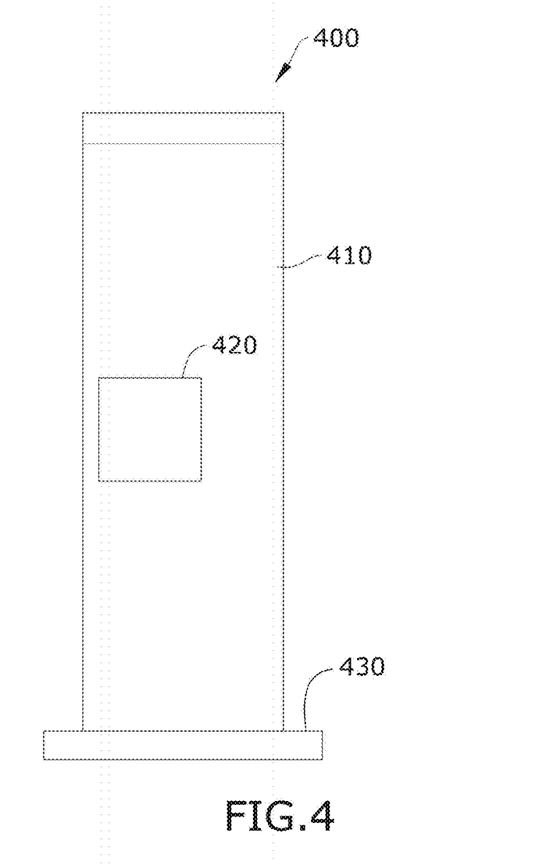
FIG. 4 conceptually illustrates a pluggable network switch FPGA offload module in some embodiments.

Specifically, FIG. 4 conceptually illustrates a pluggable network switch FPGA offload module 400. As shown in this figure, the pluggable network switch FPGA offload module 400 includes a pluggable network switch host board module 410, an FPGA offload module 420, and a connector interface 430. In some embodiments, the pluggable network switch host board module 410 conforms to at least one of SFP+ form factor and QFSP form factor. In some embodiments, the FPGA offload module 420 is embedded in the pluggable network switch FPGA offload module 400 and integrated with the pluggable network switch host board module 410 by physical layer connections (MAC/PHY) to and from the connector interface 430. The connector interface 430 provides the physical interface for a wired signal, such as an Ethernet cable, optical cable, etc, and integrates the transceiver functions of the pluggable network switch FPGA offload module 400 (i.e., the streams are received at the receiver MAC/PHY $R_X$ 310 and transmitted at the transmitter MAC/PHY $T_X$ 350).

Figure 5:
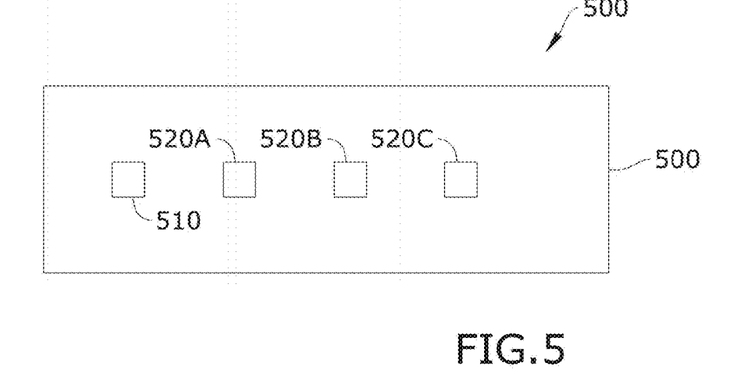
FIG. 5 conceptually illustrates a switch device that includes the FPGA offload module in some embodiments.

By way of example, FIG. 5 conceptually illustrates an Ethernet switch device 500 that includes a plurality of Ethernet sockets and an FPGA offload module socket. Specifically, the plurality of Ethernet sockets include a first Gbits/s Ethernet socket 520A, a second Gbits/s Ethernet socket 520B, and a third Gbits/s Ethernet socket 520C, while the FPGA offload module socket 510 relates directly to the connector interface 430 of the pluggable network switch FPGA offload module 400.

In some embodiments, the logic that aligns the two video stream inputs is implemented as an embedded computer program on the FPGA offload module. The logic may be understood by a person of ordinary skill in the art as being machine code (compiled and machine readable), interpreted programming code (Java, etc.), high level programming code (e.g., C, C++, etc.). The logic that aligns the two video stream inputs corresponds to steps of processes described in this specification, namely, the seamless frame-level switching process, described above by reference to FIG. 1, and the stream alignment process for aligning primary and secondary media streams, described below by reference to FIG. 8. For purposes of the embodiments described in this specification, however, a person skilled in the relevant art would appreciate that the scope of description of the alignment of two media streams can vary. In any event, when the streams are exactly aligned (detected by examining the time stamp information in the streams) the switches are ready for switching. On the other hand, when the two streams are not exactly aligned, then the alignment logic precisely aligns the two streams. To do so, the alignment logic detects a video frame boundary and switches from one video stream to the other video stream.

In many cases, switching packet losses and/or duplication of one or more packets occurs during the switching stage. In cases where packet losses are detected, packet recovery is performed to make up for the lost packets. Similarly, in some cases there will be duplicate packets detected. For example, if packet duplication arises when switching back from the FPGA offload module to the ingress port, then the endpoint drops the duplicates. Likewise, if packet loss is detected when switching back from the FPGA offload module to the ingress port, then the lost/dropped packets are recovered/regenerated. In some embodiments, the packet integrity of the streams is determined and corrected (i.e., dropping duplicate packets and recovering or regenerating lost or dropped packets) by Forward Error Correction ("FEC") or redundant stream switching. Applying FEC to recover lost packets is described next.

Figure 6:
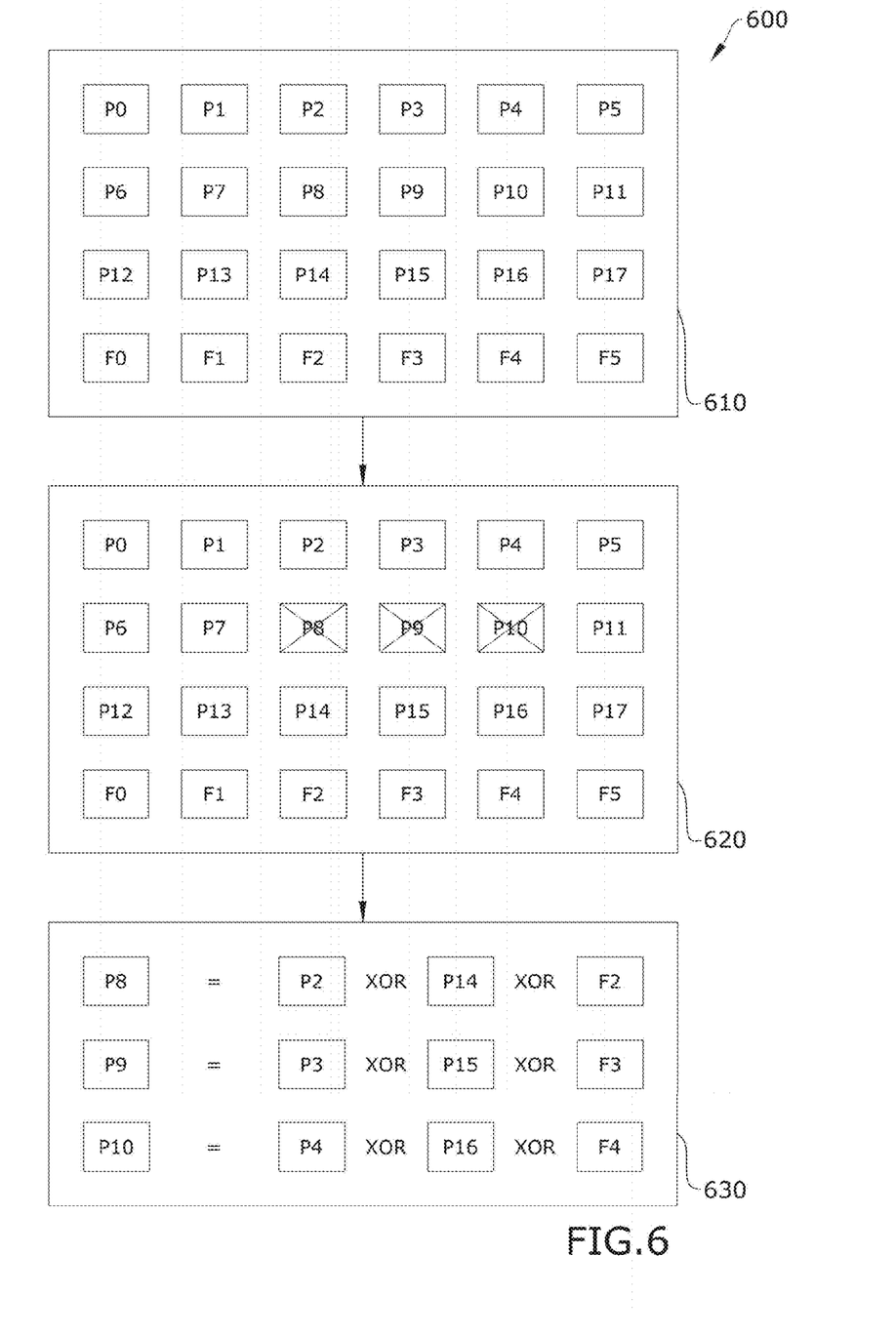
FIG. 6 conceptually illustrates an example of forward error correction (FEC) applied to a switching loss in some embodiments.

By way of example, FIG. 6 conceptually illustrates an example of forward error correction ("FEC") applied to a switching loss 600. In this example, FEC is applied to a switching loss over three phases: a first phase 610, a second phase 620, and a third phase 630. As shown in the first phase 610, several packets (P0-P17 and F0-F5) are populated left to right, top to bottom. Interleaved "exclusive or" ("XOR") FEC is applied to the columns of packets, and the resulting FEC packets are sent on a separate UDP port.

When switching the egress port to or from the switcher module, switching losses can occur. An example of such switching losses is demonstrated in the second phase 620, where packets P8, P9, and P10 are lost.

Turning to the third phase 630, the lost packets P8-P10 are recovered using interleaved XOR FEC. Specifically, P8 gets the value of the interleaved XOR operation applied to P2, P14, and F2 (i.e., P8=P2 XOR P14 XOR F2), P9 gets the value of the interleaved XOR operation applied to P3, P15, and F3 (i.e., P9=P3 XOR P15 XOR F3), and P10 gets the value of the interleaved XOR operation applied to P4, P16, and F4 (i.e., P10=P4 XOR P16 XOR F4).

To make the FPGA offload module of the present disclosure, the FPGA offload module would be designed and manufactured to adhere to SFP+ or QSFP form factor module specifications. FPGA firmware, and switch software would be designed and tested on a selected switch hardware platform, or multiple switch hardware platforms.

In some embodiments, switch hardware may be integrated into the endpoint, with an alternative embodiment limited to customize IP/Ethernet switch hardware because standard off-the-shelf IP/Ethernet switch hardware would not be viable, and furthermore, software-based endpoints would not be possible.

To use the FPGA offload module of the present disclosure, one may use interfaces, APIs, and other programmatic mechanisms to use and/or manage operation of the switch hardware devices in which the FPGA offload module exists and the process operates. For instance, open software APIs could be used to manage switches and endpoints for live IP-based video production. The switch and endpoint software would comply with these open API's, so use of distributed switches would operate within a standards-based production workflow.

III. Processes for Seamless IP Switching of Media Streams

Figure 7:
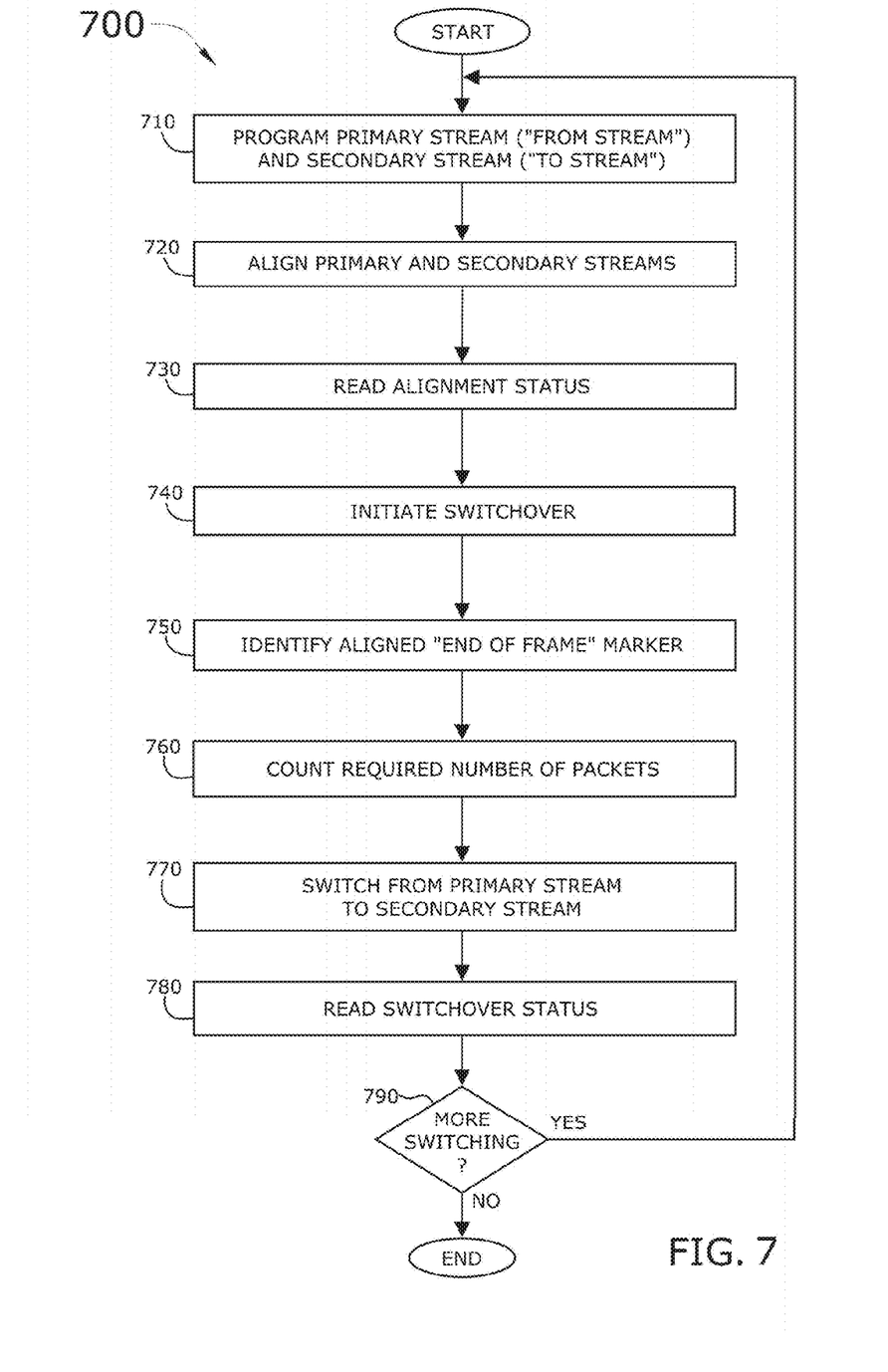
FIG. 7 conceptually illustrates an offload module stream switching process for switching from a primary media stream to a secondary media stream in some embodiments.

In some embodiments, several detailed processes for seamless IP switching of media streams are performed by the network switch module, the FPGA offload module, and the endpoint, including an offload module stream switching process for switching from a primary media stream to a secondary media stream, a stream alignment process for aligning primary and secondary media streams, and an endpoint switch-over process By way of example, FIG. 7 conceptually illustrates an offload module stream switching process 700 for switching from a primary media stream to a secondary media stream. As shown in this figure, the offload module stream switching process 700 starts by programming (at 710) a primary media stream (the "from" stream) and a secondary media stream (the "to" stream).

In some embodiments, the offload module stream switching process 700 aligns (at 720) the primary and second media streams. More details about aligning the streams is described below, by reference to FIG. 8.

After alignment of the streams is completed, the offload module stream switching process 700 of some embodiments reads (at 730) the alignment status. In some embodiments, the alignment status indicates whether the primary and secondary streams were able to be aligned or not. When the alignment status indicates that the streams are aligned, then the offload module stream switching process 700 initiates (at 740) a switch-over of the streams.

To complete a switch-over of the streams, the offload module stream switching process 700 of some embodiments identifies (at 750) an aligned "end of frame" marker. In some embodiments, the offload module stream switching process 700 then counts (at 760) the required number of packets.

In some embodiments, the offload module stream switching process 700 now switches (at 770) from the primary stream to the secondary stream. The offload module stream switching process 700 then reads (at 780) the switch-over status. In some embodiments, the offload module stream switching process 700 determines (at 790) whether to continue more switching or not. When more switching is needed, the offload module stream switching process 700 of some embodiments transitions back to the start of the offload module stream switching process 700, which is described above. On the other hand, when more switching is not needed, then the offload module stream switching process 700 ends.

Figure 8:
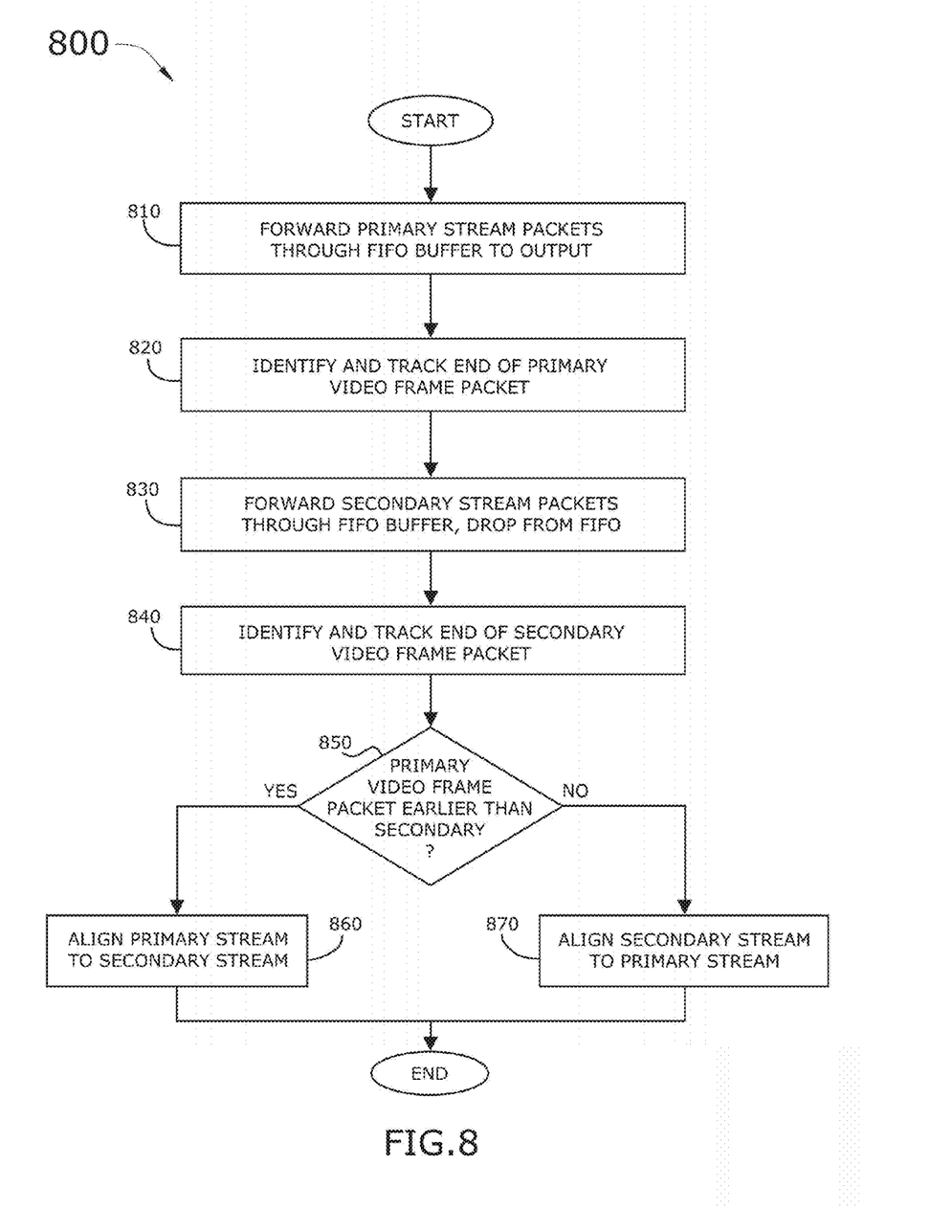
FIG. 8 conceptually illustrates a stream alignment process for aligning primary and secondary media streams in some embodiments.

Now turning to FIG. 8, which conceptually illustrates a stream alignment process 800 for aligning primary and secondary media streams. The stream alignment process 800 is one example of the steps involved in completing step 720 of the offload module stream switching process 700, described above by reference to FIG. 7. Therefore, the stream alignment process 800 can be applied independently or as a sub-process of the offload module stream switching process 700. Furthermore, the stream alignment process 800 includes several steps which, as a sub-process of the offload module stream switching process 700, are performed after the offload module stream switching process 700 programs the primary and secondary media streams (at 710), but before the offload module stream switching process 700 reads the alignment status (at 730).

In some embodiments, the stream alignment process 800 starts by forwarding (at 810) primary media stream packets through a "first in, first out" ("FIFO") buffer to output. Next, the stream alignment process 800 identifies and tracks (at 820) the end of a primary stream video frame packet.

In some embodiments, the stream alignment process 800 then forwards (at 830) secondary stream packets through a FIFO buffer, and drops from the FIFO. Next, the stream alignment process 800 of some embodiments identifies and tracks (at 840) the end of the secondary video frame packet.

In some embodiments, the stream alignment process 800 determines (at 850) whether the primary video frame packet is earlier than the secondary video frame packet. When the stream alignment process 800 affirmatively determines (at 850) that the primary video frame packet is earlier than the secondary video frame packet, then the stream alignment process 800 aligns (at 860) the primary stream to the secondary stream. On the other hand, when the stream alignment process 800 negatively determines (at 850) that the primary video frame packet is not earlier than the secondary video frame packet, then the stream alignment process 800 aligns (at 870) the secondary stream to the primary stream. Then the stream alignment process 800 ends.

Figure 9:
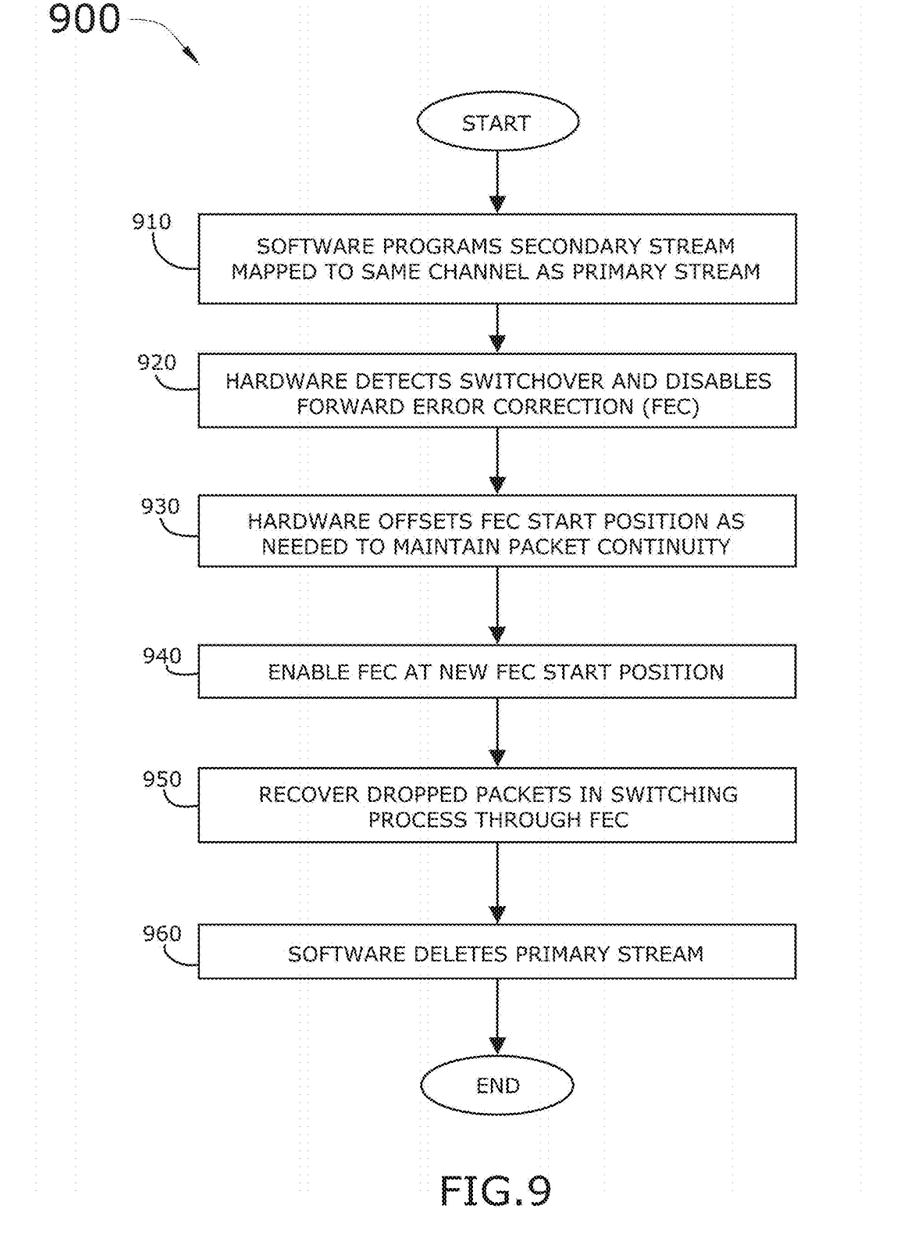
FIG. 9 conceptually illustrates an endpoint switch-over process in some embodiments.

Now turning to another example process, FIG. 9 conceptually illustrates an endpoint switch-over process 900. In some embodiments, the endpoint switch-over process 900 is performed after the primary and secondary streams are aligned. As shown in this figure, the endpoint switch-over process 900 starts when the endpoint software programs (at 910) the secondary stream to be mapped to the same channel as the primary stream. In some embodiments, the endpoint switch-over process 900 continues with the hardware detecting (at 920) the switch-over and then disables forward error correction (FEC).

In some embodiments of the endpoint switch-over process 900, the hardware then offsets (at 930) the start position of the forward error correction (FEC) as is needed in order to maintain packet continuity. Next, the endpoint switch-over process 900 enables (at 940) forward error correction (FEC) at the new offset start position.

With forward error correction (FEC) enabled, the endpoint switch-over process 900 of some embodiments recovers (at 950) dropped packets that were lost/dropped during the switching process, by using forward error correction (FEC). An example of using forward error correction (FEC) is described above, by reference to FIG. 6.

In some embodiments, the endpoint switch-over process 900 continues to the next step at which the software deletes (at 960) the primary stream. The primary stream is deleted as it is no longer needed, since the alignment and switch-over have been successfully completed. In some embodiments, after deleting the primary stream, the endpoint switch-over process 900 ends. While this endpoint switch-over process 900, and the previously described processes (i.e., the seamless frame-level switching process 100 for seamless frame-level switching of media streams in real-time, the offload module stream switching process 700, and the stream alignment process 800) all pertain to series of steps that include sequenced orders of operations, a person skilled in the relevant art would appreciate that not all operations of all steps in every process or method must be carried out in the order indicated, but that these processes and the order of the steps for carrying out these processes varies according to the implementation needs of the hardware and software carrying out the operations being performed. Therefore, these processes and the steps for carrying out these processes are not to be restricted to any limited understanding of the invention, but instead, are to be understood as exemplary of the embodiments described here, and that the above-described embodiments of the invention are presented for purposes of illustration and not of limitation.

IV. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, EEPROMs, etc. The computer readable media does not include carrier waves and electronic signals passing wirelessly or over wired connections.

In this specification, the term "software" is meant to include firmware residing in read-only memory or applications stored in magnetic, electronic, or optical storage, which can be read into memory for processing by a processor. Also, in some embodiments, multiple software inventions can be implemented as sub-parts of a larger program while remaining distinct software inventions. In some embodiments, multiple software inventions can also be implemented as separate, possibly interacting, programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
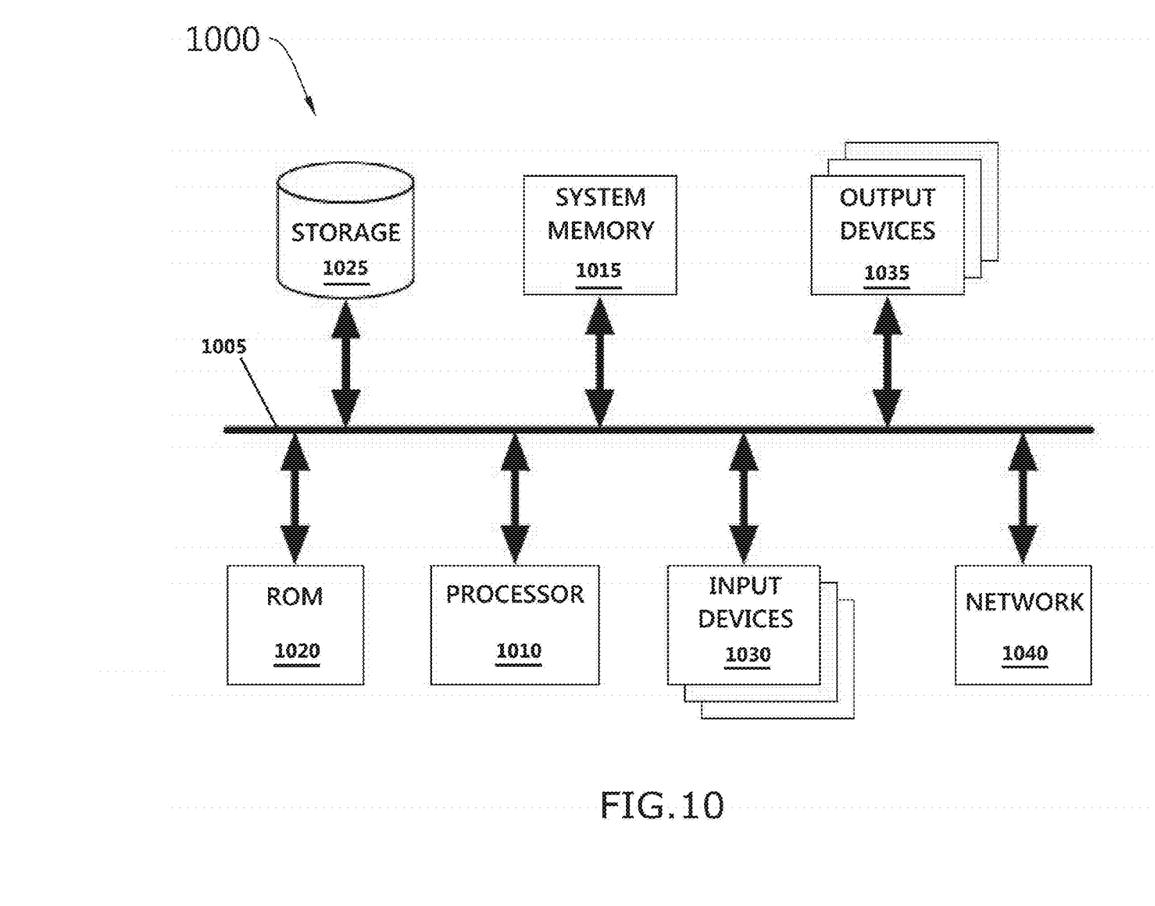
FIG. 10 conceptually illustrates an electronic system with which some embodiments of the invention are implemented.

FIG. 10 conceptually illustrates an electronic system 1000 with which some embodiments of the invention are implemented. The electronic system 1000 may be a computer, phone, PDA, or any other sort of electronic device. Such an electronic system includes various types of computer readable media and interfaces for various other types of computer readable media. Electronic system 1000 includes a bus 1005, processing unit(s) 1010, a system memory 1015, a read-only 1020, a permanent storage device 1025, input devices 1030, output devices 1035, and a network 1040.

The bus 1005 collectively represents all system, peripheral, and chipset buses that communicatively connect the numerous internal devices of the electronic system 1000. For example, the bus 1005 communicatively connects the processing unit(s) 1010 with the read-only memory 1020, the system (ephemeral) memory 1015, and the permanent storage device 1025.

From these various memory units, the processing unit(s) 1010 retrieves instructions to execute and data to process in order to execute the processes of the invention. The processing unit(s) may be a single processor or a multi-core processor in different embodiments.

The read-only-memory (ROM) 1020 stores static data and instructions that are needed by the processing unit(s) 1010 and other modules of the electronic system. The permanent storage device 1025 is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1025.

Other embodiments use a removable storage device (such as a floppy disk or a flash drive) as the permanent storage device 1025. Like the permanent storage device 1025, the system memory 1015 is a read-and-write memory device. However, unlike storage device 1025, the system memory 1015 is a volatile read-and-write memory, such as a random access memory. The system memory 1015 stores some of the instructions and data that the processor needs at runtime. In some embodiments, the invention's processes are stored in the system memory 1015, the permanent storage device 1025, and/or the read-only 1020. For example, the various memory units include instructions for processing appearance alterations of displayable characters in accordance with some embodiments. From these various memory units, the processing unit(s) 1010 retrieves instructions to execute and data to process in order to execute the processes of some embodiments.

The bus 1005 also connects to the input and output devices 1030 and 1035. The input devices enable the user to communicate information and select commands to the electronic system. The input devices 1030 include alphanumeric keyboards and pointing devices (also called "cursor control devices"). The output devices 1035 display images generated by the electronic system 1000. The output devices 1035 include printers and display devices, such as cathode ray tubes (CRT) or liquid crystal displays (LCD). Some embodiments include devices such as a touchscreen that functions as both input and output devices.

Finally, as shown in FIG. 10, bus 1005 also couples electronic system 1000 to a network 1040 through a network adapter (not shown). In this manner, the computer can be a part of a network of computers (such as a local area network ("LAN"), a wide area network ("WAN"), or an intranet), or a network of networks (such as the Internet). Any or all components of electronic system 1000 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For example, FIGS. 1 and 7-9 conceptually illustrate processes for seamless frame-level switching of media streams in real-time. The specific operations of each process may not be performed in the exact order shown and described. Specific operations may not be performed in one continuous series of operations, and different specific operations may be performed in different embodiments. Furthermore, the each process could be implemented using several sub-routine methods or processes, or as part of a larger macro method or process. Thus, one of ordinary skill in the art would understand that the invention is not to be limited by the foregoing illustrative details, but rather is to be defined by the appended claims.

We claim:

1. A process for seamless frame-level switching of media streams in real-time, said process comprising:

forwarding, by an Internet protocol (IP) switch device, a first video data stream to a field programmable gate array (FPGA) offload module that includes a switch multiplexer;

identifying and tracking an end of a first video frame;
forwarding, by the IP switch device, a second video data stream to the FPGA offload module;
identifying and tracking an end of a second video frame;
determining whether the end of the first video frame is earlier than the end of the second video frame;
aligning, by the FPGA offload module, the first video data stream and the second video data stream;
switching, by the switch multiplexer of the FPGA offload module, from the first video data stream to the second video data stream; and
reconstituting, by a switch endpoint, stream packet integrity by ensuring that any duplicate packets are dropped and any missing packets are recovered.

2. The process of claim 1 further comprising forwarding, by the FPGA offload module, the first video data stream to an output destination.

3. The process of claim 1 further comprising switching, by the IP switch device, the FPGA offload module to an egress port.

4. The process of claim 3 further comprising switching, by the IP switch device, the egress port away from the FPGA offload module to a media source port after the FPGA offload module switches from the first video data stream to the second video data stream.

5. The process of claim 1 further comprising identifying, by the FPGA offload module, a video frame boundary.

6. The process of claim 5, wherein switching from the first video data stream to the second video data stream comprises switching from the first video data stream to the second video data stream at the video frame boundary.

7. The process of claim 1, wherein reconstituting stream packet integrity by ensuring that any duplicate packets are dropped and any missing packets are recovered further comprises using forward error correction.

8. The process of claim 1, wherein reconstituting stream packet integrity by ensuring that any duplicate packets are dropped and any missing packets are recovered further comprises using redundant stream switching.

9. The process of claim 1, wherein said duplicate packets comprise packets sent during a switch back from the FPGA offload module to an ingress port.

10. The process of claim 9, wherein said missing packets comprise packets lost during the switch back from the FPGA offload module to the ingress port.

11. The process of claim 1, wherein aligning the first video data stream and the second video data stream comprises aligning the first video data stream to the second video data stream when the first video frame packet is earlier than the second video frame packet.

12. The process of claim 1, wherein aligning the first video data stream and the second video data stream comprises aligning the second video data stream to the first video data stream when the second video frame packet is earlier than the first video frame packet.

13. The process of claim 1, wherein switching from the first video data stream to the second video data stream comprises mapping the second video data stream to a same channel as the first video data stream.

14. The process of claim 13, wherein switching from the first video data stream to the second video data stream further comprises:
disabling forward error correction (FEC);
offsetting a FEC start position as needed based on maintaining packet integrity maintenance that drops duplicate packets and recovers missing packets; and
enabling FEC at the offset FEC start position.

15. The process of claim 14, wherein switching from the first video data stream to the second video data stream further comprises deleting the first video data stream after switch-over is completed.

* * * * *